(12) United States Patent
Datta et al.

(10) Patent No.: US 6,464,880 B1
(45) Date of Patent: Oct. 15, 2002

(54) MICROPOROUS IONOMERIC MATERIALS AND METHODS OF PREPARATION

(75) Inventors: Rathin Datta, Chicago, IL (US); Shih-Perng Tsai, Naperville, IL (US); Michael P. Henry, Batavia, IL (US)

(73) Assignee: University of Chicago, Chicago, IL (US)

( * ) Notice: Subject to any disclaimer, the term of this patent is extended or adjusted under 35 U.S.C. 154(b) by 56 days.

(21) Appl. No.: 09/664,838

(22) Filed: Sep. 19, 2000

(51) Int. Cl.⁷ ................................................ B01D 61/00
(52) U.S. Cl. .................. 210/651; 210/638; 210/500.27; 210/500.36; 264/41; 264/154; 156/43
(58) Field of Search .......................... 264/41, 154, 156; 156/43; 210/640, 638, 500.27, 500.36, 651; 96/4; 95/45, 52

(56) References Cited

U.S. PATENT DOCUMENTS

| | | | |
|---|---|---|---|
| 4,243,508 A | * | 1/1981 | Dankese |
| 4,783,202 A | * | 11/1988 | Kraus et al. |
| 4,851,125 A | * | 7/1989 | Dotson et al. |
| 4,879,041 A | * | 11/1989 | Kurokawa et al. |
| 4,943,618 A | * | 7/1990 | Stoy et al. |
| 5,143,526 A | * | 9/1992 | Lee et al. |
| 5,662,878 A | * | 9/1997 | Datta et al. |
| 5,976,324 A | * | 11/1999 | Groschl et al. |
| 5,985,164 A | * | 11/1999 | Chu et al. |

* cited by examiner

Primary Examiner—Ana Fortuna
(74) Attorney, Agent, or Firm—Cherskov & Flaynik

(57) ABSTRACT

A method is provided for producing porous hydrophilic materials whereby nonporous materials are subjected to ester hydrolysis to generate site-specific perforations. Processes for separating aqueous phase from organic and aqueous mixtures utilizing the invented materials also are provided.

15 Claims, 6 Drawing Sheets

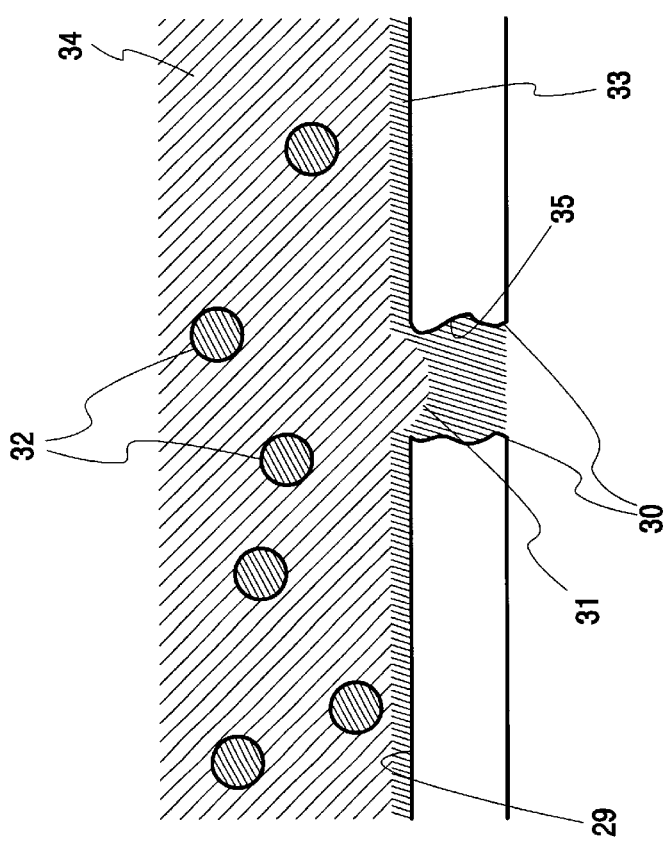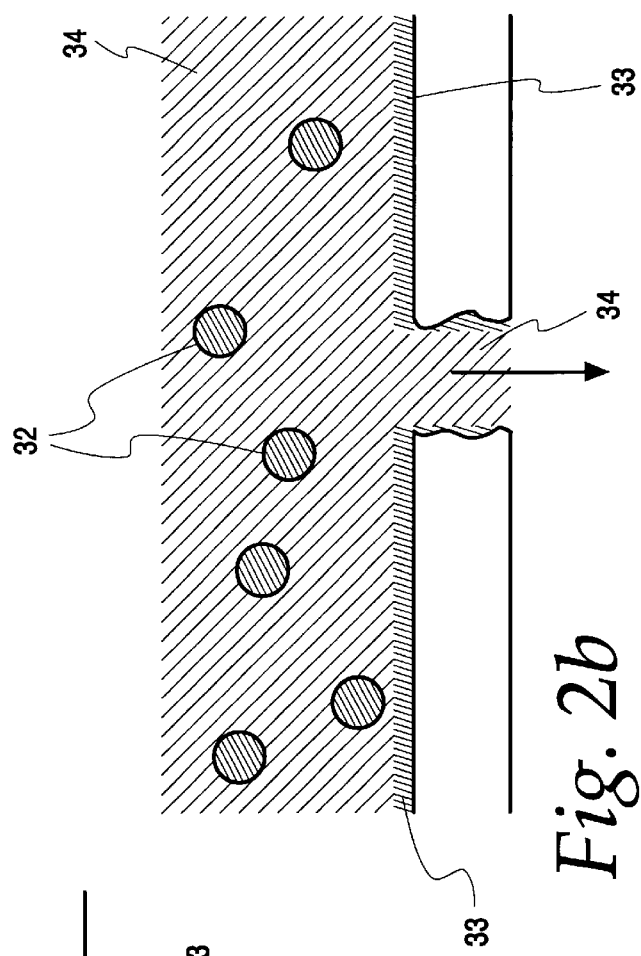

MICROPOROUS IONOMERIC MATERIALS AND METHODS OF PREPARATION

CONTRACTUAL ORIGIN OF THE INVENTION

The United States Government has rights in this invention pursuant to Contract Number W-31-109-ENG-38 between the United States Government and Argonne National Laboratory.

BACKGROUND OF THE INVENTION

1. Field of the Invention

This invention relates to a method for making porous materials and a method for purifying aqueous phase using such materials. More particularly, this invention relates to a method for making porous, hydrophilic, oxidatively stable materials and a method for purifying hydrophilic compounds using such materials.

2. Background of the Invention

The demand for aqueous-based chemicals continues to increase, partly due to environmental concerns, and partly due to the nonrenewability of petroleum feedstocks. Hydrogen peroxide, alcohols, ethers, carboxylic acids and esters are just a few polar compounds holding promises as green substitutes to more traditional petrochemical-based moieties.

Hydrogen peroxide is a very important chemical, with worldwide production exceeding 2 million tons per year. It is used in advanced and environmentally friendly pulp and paper manufacturing processes, for environmental remediation in other industries, for production of specialty chemicals, for laundry products, for electronics manufacturing, and in many other applications. Demand over the past decade has been growing at an annual rate of 10%.

There is a huge potential for the use of hydrogen peroxide in the manufacture of many large-volume commodity petrochemicals via efficient and environmentally friendly processes. The potential tonnage of chemicals such as propylene oxide, caprolactam, and phenol exceeds 4 million tons per year.

Hydrogen peroxide has the potential of being the ultimate environmentally friendly "green" chemical. However, current processes for producing hydrogen peroxide are complex. Typical $H_2O_2$ production processes are based on anthraquinone reduction chemistry. The process steps are as follows:

(1) hydrogenation of anthraquinone in a fixed bed reactor;
(2) separation of the catalyst fines;
(3) oxidation of the hydrogenated anthraquinone working solution by air in a multi-stage packed bed tower while simultaneously producing $H_2O_2$ in the organic stream;
(4) extraction of the $H_2O_2$ from the anthraquinone working solution by water in a multistage counter-current extraction column process;
(5) recovery and polish purification of the anthraquinone working solution, the accompanying solvents and their recycle to the hydrogenator; and
(6) recovery, polish purification and stabilization of the $H_2O_2$ product. aqueous-based chemicals, such as hydrogen peroxide, are concomitantly generated with less-polar moieties.

The process outlined above, and further disclosed in U.S. Pat. No. 2,158,525 to Pfliderer and U.S. Pat. No. 2,215,883 to Riedel is typical for large scale procedures. Not only do these production processes require multiple steps, but such multi-step procedures require multiple reaction beds, each several feet tall. As such, the incorporation of the above-disclosed processes in small-scale scenarios is not warranted.

U.S. Pat. No. 5,662,878, awarded to the instant Assignee on Sep. 2, 1997, teaches a process for selective pervaporation of hydrogen peroxide ($H_2O_2$) through pervaporation membranes to provide an organic free solution. Generally, the pervaporation membranes consist of a nonporous, polyvinyl alcohol active layer on a porous supporting layer. Another membrane, NAFION® by DuPont, uses a hydrophilic-derivatized Teflon. The '878 process offers a vastly simplified $H_2O_2$ protocol, but still requires multiple steps.

Perfluorinated ionomers, such as the above-mentioned NAFION®, have excellent chemical stability, and because of ionic charge groups, are inherently hydrophilic. NAFION is widely used in commercial chloro-alkali processes and has a long membrane life, despite the rigorous process conditions. However, NAFION and other perfluorinated ionomer membranes, and other ion-exchange membranes are non-porous and thus unsuitable for filtration separation.

Heretofore, the transport mechanisms for any separation applications using membranes were based on either ion exchange (as in the electrochemical applications), or perneation/diffusion (as in the dehydration applications). Such transport mechanisms have several drawbacks, including inherently low flux (<1 $kg/m^2 \cdot h$), the need for very thin (and therefore fragile) membranes, and the need to operate at high temperatures. However, hydrogen peroxide is unstable at high temperatures.

Microporous membranes that are completely coated with perfluorinated ionomers and thus rendered non-porous have been developed by others such as Pellegrino et al, U.S. Pat. No. 5,258,202 and Bardot et al., U.S. Pat. No. 5,342,521. Although such membranes have hydrophilic and oxidatively stable surfaces, the membranes are non-porous and the underlying substrate materials are still subject to oxidative degradation.

A need exists in the art for a method of preparing oxidatively stable, hydrophilic, microporous materials suitable for filtration separation in the presence of hydrogen peroxide or other chemically rigorous environments. The material should be homogenous in that it be made entirely of oxidatively stable materials. A need also exists in the art for a method of separating aqueous phase from organic phase by filtration using such materials.

SUMMARY OF THE INVENTION

An object of the present invention is to provide a method for producing hydrophilic, porous materials and a method using the materials for separating chemicals that overcome many of the disadvantages of the prior art.

Another object of the present invention is to provide a method for producing an oxidatively stable material with controlled porosity. A feature of the method is producing gaseous product at catalytic ion-exchange sites of a non-porous, oxidatively stable material to induce regio-specific perforations at those sites in the material. An advantage of this invention is that porosity is controlled by varying the reaction conditions.

An additional object of the present invention is to provide a method for purifying chemicals via pressure filtration. A feature of this invention is utilizing porous hydrophillic membranes to separate aqueous phase from organic liquors. An advantage of the invention is that the method provides a flux of at least approximately 5 kg/m² hour, and more typically 10 kg/m² hour which is approximately 10 times higher than the flux achieved by currently-available ion-exchange methods or permeation/diffusion methods. Another advantage is that high through-put of aqueous phase does not decrease significantly as the ratio of aqueous to organic phase decreases.

Still another object of the present invention is to provide a porous hydrophillic material. A feature of the invention is that the material is homogenous in that it is made entirely of oxidatively stable materials. An advantage of the invention is that, unlike microporous structures merely coated with perfluorinated ionomers, the instant material is made entirely of perfluorinated ionomer and thus, is resistant throughout to oxidative degradation.

Briefly, the invention provides for a method for producing a porous, ionic hydrophilic material, the method comprising supplying a nonporous, substrate containing localized ionic hydrophilic chemical clusters; and forming controlled pore sized and evenly distributed apertures in the clusters in situ via chemical reactions.

A method for separating aqueous phases from organic solution is provided comprising supplying an ionomeric membrane having hydrophillic regions defining pores, wherein the membrane has a first surface and a second surface; contacting the organic solution to the first surface for a time and at a pressure sufficient to facilitate transfer of the aqueous phase through the pores; and collecting the aqueous phase from the second surface.

A porous hydrophilic, organic, polymeric material also is provided comprising amorphous ionomeric phases, and regions within said amorphous phases defining apertures.

BRIEF DESCRIPTION OF THE DRAWING

Other objects, features, and advantages of the present invention will become apparent from the following description and the accompanying drawings, wherein:

FIG. 2A is a schematic diagram of aqueous phase transport through the invented material; in accordance with features of the present invention;

FIG. 2B is a schematic diagram of multi-phase transport through the invented material;

DETAILED DESCRIPTION OF THE INVENTION

The invention provides a porous hydrophilic material and a method for producing porous hydrophilic materials. The invention also provides a method for using porous hydrophillic membranes to extract aqueous phase from organic liquors.

The method exploits the crystalline and amorphous character of perfluorinated ionomer material by forming apertures in regions of the material containing ionic centers. In essence, what results are transverse apertures having hydrophilic peripheries and walls. These apertures "wick" or otherwise induce aqueous phase to pass through the aperture, even as the aqueous phase to organic phase ratio in the subject feedstream becomes very low. As such, the wicking effect enhances the flux rate of aqueous phase during pressure filtration.

A salient feature of this invention is subjecting the material to ester hydrolysis to induce porosity, optionally followed by introduction of a porosigen to maintain porosity. Specifically, ester hydrolysis generates gas within the material (i.e. in situ), disrupting the integrity of the material. Essentially, portions of the material are separated from each other via an expansive force generated within the structure of the material, the expansive force the result of a chemical reaction which produces an expanding fluid, such as a gas.

Exemplary reaction sequences leading to gas production are depicted infra in Equations 1–2:

Methyl lactate+$H_2O$→Lactic Acid+Methanol↑      Eq. 1

Propylene Carbonate+$H_2O$→Propylene glycol+$CO_2$↑      Eq. 2

Once pores are created, the porosigen, (i.e., a macromolecule) is inserted to maintain the pore structure. The relative molecular weight of the porosigen appears to correlate to the size of the material pores, with higher molecular weight molecules conferring greater size to resulting opened ionic regions. The porosigen is subsequently removed, leaving behind a stable, porous material.

This porosity is not diminished over time. In fact, the inventors tracked porosity for twenty days and did not observe any appreciable decline in porosity.

Foundation Material
Material Detail

Various starting materials are available in which pores are formed. Generally, organic, polymeric, and ionomeric materials are suitable. Hydrophilic materials made of poly-ether sulfones, regenerated cellulose, sulfonated styrene divinyl benzene, and per-fluorinated ionomer all show the ability to separate aqueous phases containing water, hydrogen peroxide and other dissolved hydrophilic chemicals from organic hydrocarbon phases.

For the sake of illustration herein, the manipulation of a perfluorinated ionomer material is discussed. Perfluorinated ionomer is a particularly attractive starting material inasmuch as it features localization of ionic charge groups. A myriad of such materials are commercially available, including NAFION® (from Dupont).

Figure 1:
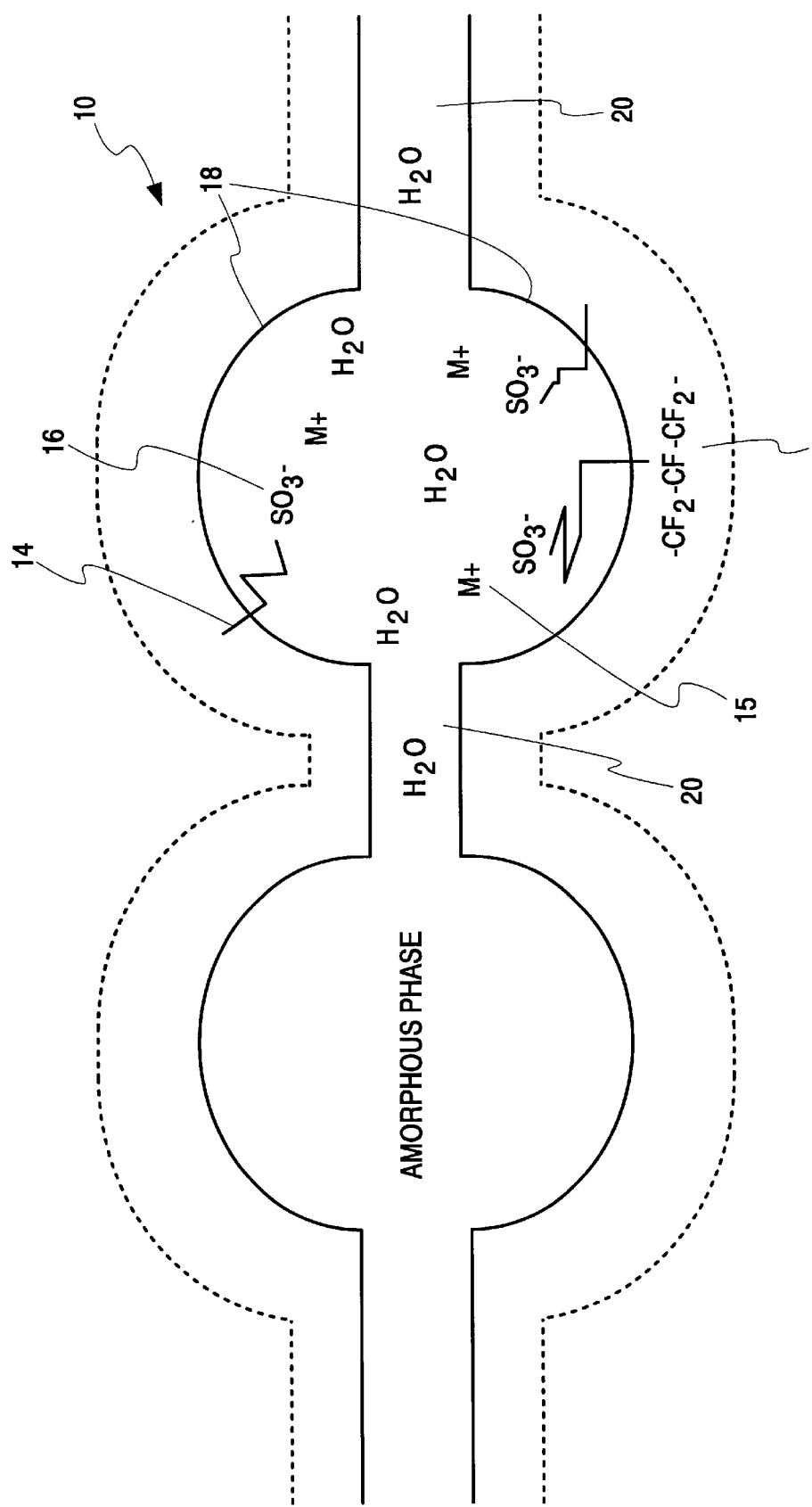
FIG. 1 is a schematic diagram of a hydrophilic ion exchange material before (solid lines) and after (dotted lines) being subjected to reactive treatment.

FIG. 1 is a schematic diagram of perfluorinated ionomer substrate, designated generally as numeral 10. FIG. 1 depicts the substrate before (solid lines) and after (dotted lines) being subjected to the pore forming process.

The substrate 10 contains a polytetrafluoroethylene backbone 12 to comprise the crystalline phase of the substrate. To the backbone 12 is attached vinyl ether pendant groups 14. These groups 14 terminate with ionic centers 16. The metal ions or protons depicted in the amorphous regions serve as the counter-ions for the negative ion groups located therein.

The ionic centers 16 cluster into amorphous phases or regions 18, each region of which has a diameter of approximately 40 angstroms (Å). Intermediate the amorphous regions are hydrophilic channels 20 of approximately 10 Å in diameter. These channels 20 connect the amorphous regions 18 and therefore allow the regions to chemically interact. Specifically, the channels allow water to flow from one amorphous region or sphere to another. The invented protocols discussed infra serve to irreversibly expand or otherwise open the amorphous regions 18 and the connecting hydrophilic regions 20. Generally, the entire amorphous region becomes a pore upon being subjected to the in-situ gas-producing process. Spectral analysis shows final pore sizes of approximately 60 Å.

Wicking Detail

The pores resulting from the invented protocols enable the treated membranes to separate hydrophilic chemicals from a hydrocarbon phase by simple pressure filtration.

However, and as noted supra, the resulting hydrophilic pores also facilitate a "wicking effect" whereby the flux of the aqueous phase through the pores is not substantially decreased, even as the aqueous to hydrocarbon phase ratio becomes very low. As depicted in FIG. 2A, this wicking effect is due to hydrophilic interactions and surface tension forces between the membrane's surface and the polar phase. Specifically, a thin aqueous film 33 is established at the porous hydrophilic surface 29. As the dispersed aqueous phase collides inelastically with this layer, it becomes absorbed in it. The layer channels the aqueous phase to the pore, thereby maintaining a high flux rate. The aqueous phase goes through the pores whereas the hydrocarbon phase must overcome a break-through pressure P, defined in Equation 1, below:

$$P = 2Y_{wo} \cos Q_c / r_p \qquad \text{Eq. 3}$$

where $Y_{wo}$ is the interfacial tension between aqueous and organic phases, $Q_c$ is the contact angle, and $r_p$ is the pore radius.

As schematically depicted in FIG. 2A, a membrane pore 30 formed via the invented method is typically filled with aqueous phase 32 due to hydrophilic interaction. If the break-through pressure is less than P, then the aqueous phase 32 continues to occupy the pore and migrate toward the pore. However, if as depicted in FIG. 2B, the filtration pressure is greater than the break-through pressure P, then the hydrocarbon phase 34 will break through the pore opening.

Figure 4:
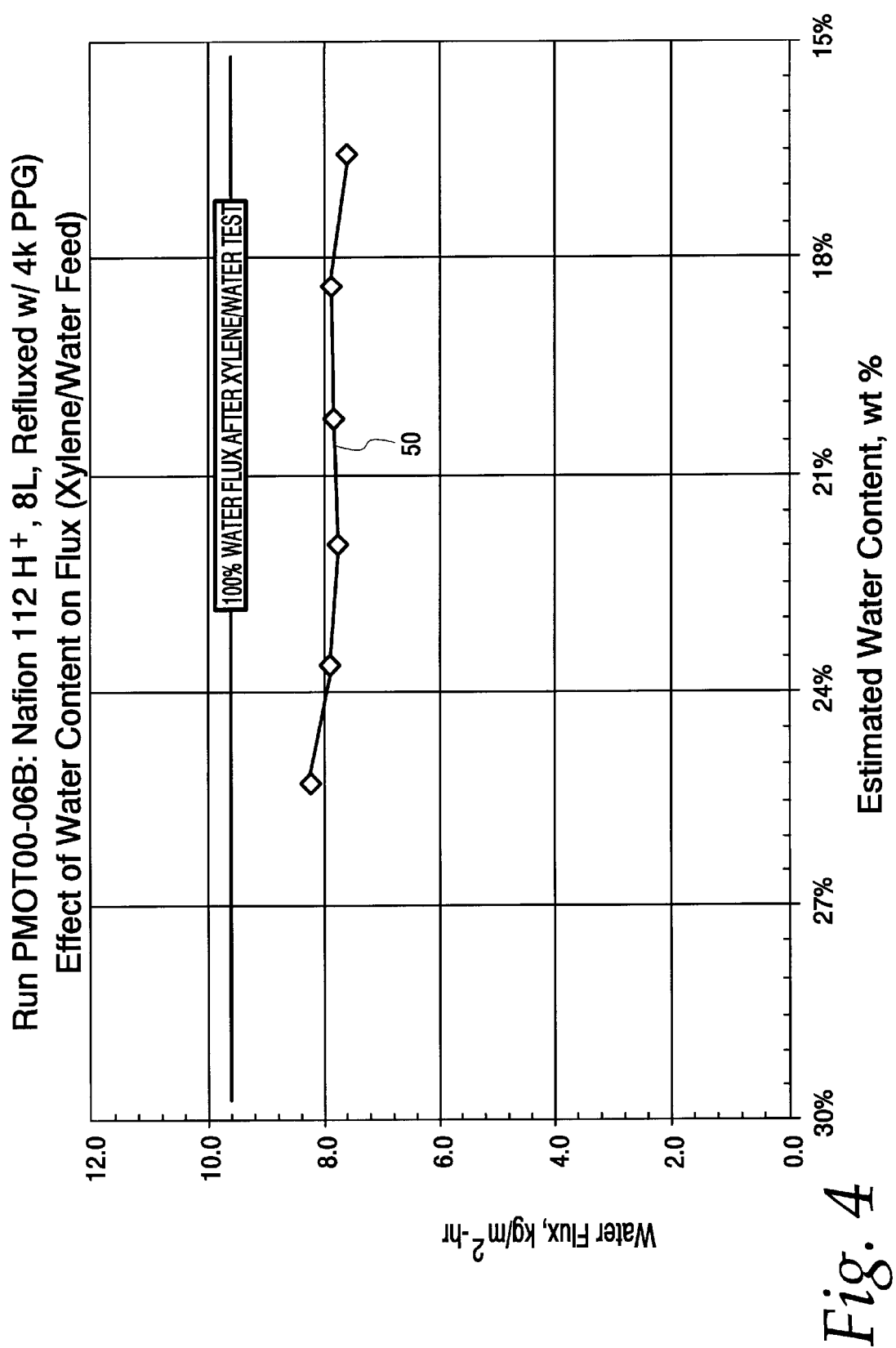
FIG. 4 is a graph demonstrating constancy of aqueous flux through an invented material, despite changes in the concentrations of feedstream constituents, in accordance with features of the present invention.

The "wicking effect" depicted in FIG. 2A explains the fact that the membrane flux does not decrease significantly as the aqueous to hydrocarbon phase ratio decreased to values of as low as 1:5 to 1:10. For example, the flux decrease from pure aqueous phase to that of a 1:6 aqueous phase in hydrocarbon is only 20 percent. FIG. 4 (discussed in more detail, infra) depicts this phenomenon, where the line 50 indicates a relatively constant rate of water flux, despite the decrease in water content. Inasmuch as the invented protocols induce pores in homogenous hydrophilic substrates, the peripheries and transversely extending regions comprising the sides 35 of the pores also are hydrophilic, thereby enhancing wicking.

Figure 3:
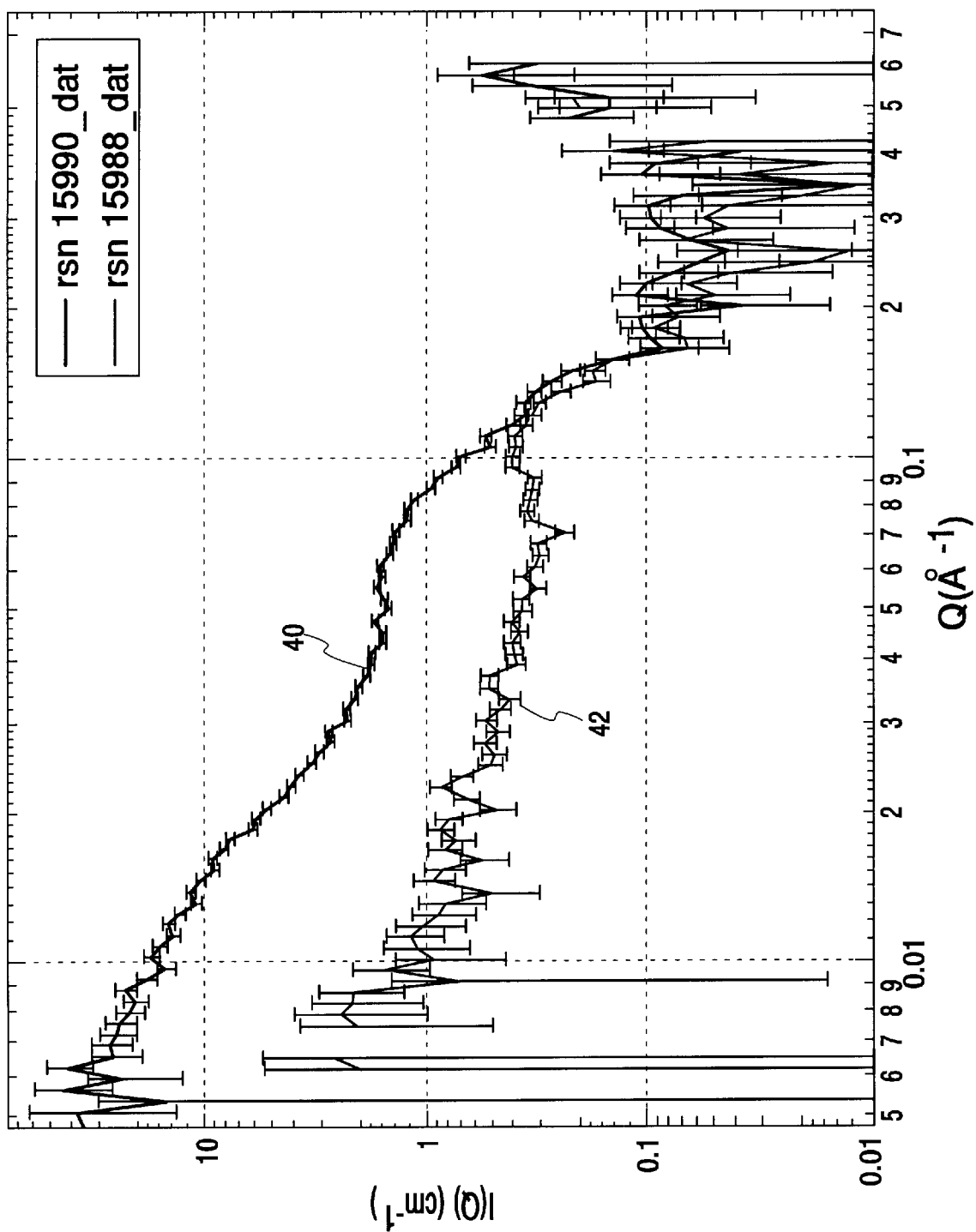
FIG. 3 is a graph of relative structure regularity as seen by small-angle intense pulsed neutron source spectroscopy, indicating the presence or absence of expanded ionic cluster regions, in accordance with features of the invention.

FIG. 3 represents data relating to domain size as seen by small angle intense pulsed neutron source spectra. The upper curve 40 is for the microporous material generated via the current invented method. This material has a regularity in domain size of between 50–60 Å, indicating the controlled expansion of the ionic centers. This contrasts with the lower curve 42, depicting untreated material (i.e., non-porous) wherein no such regularity in that size range is evident. Domain regularity is an indication of a structure having regions of a certain size.

In summary, the inventors have devised a way to induce pores in hydrophilic substrates via ester-hydrolysis. The protocol follows:

Ester Hydrolysis
Protocol Detail

Generally, the ester-hydrolysis mechanism results in the release of a volatile alcohol or gas at the hydrophilic catalytic sites of the substrate. Optionally, a porosigen polymer is temporarily embedded at the altered sites, simultaneously with pore formation.

Table 1, infra, provides variations of the general ester hydrolysis theme.

TABLE 1

Materials and Treatment Conditions

| Filtration Test ID | Starting Material | Treatment Conditions |
|---|---|---|
| PMOT99-14 (Control) | Fresh Nafion 112 in H⁺ form | None |
| PMOT99-15 | Fresh Nafion 112 in H⁺ form | Refluxed 3 hours in 6:1 mol ratio of water and propylene carbonate |
| PMOT99-17 | Material from PMOT99-15 | Refluxed for an additional 6 hours in 6:1 mol ratio of water and propylene carbonate |
| PMOT99-20 | Material from PMOT99-17 | Refluxed for an additional 3 hours in 6:1 mol ratio of water and propylene carbonate and 1 wt % of 1000 MW PPG |
| PMOT00-01 | Fresh Nafion 112 in H⁺ form | Refluxed 3 times: 1) 6 hrs in 6:1 mol ratio of water and propylene carbonate 2) 3 hrs in 6:1 mol ratio of water and propylene carbonate 3) 3 hrs in 6:1 mol ratio of water and propylene carbonate and 1 wt % of 1000 MW PPG |
| PMOT00-06C | Fresh Nafion 112 in H⁺ form | Refluxed 6 hrs in 6:1 mol ratio of water and propylene carbonate and 2 wt % of 4000 MW PPG |

The following is a reaction method of material perforation via ester-hydrolysis:

EXAMPLE 1

Approximately 1.2-L of a selected fluid media is loaded into a 2-L glass reaction flask. The choice of fluid can vary in the process, but a typical solution consists of a 6:1 mole ratio of water and propylene carbonate to which about 1 wt percent of 1,000 MW polypropylene glycol has been added. The material sample (typically 7 inches square) is then maintained in an immersed position in the fluid.

A 3-neck reactor head plate is then installed on the reactor using a Teflon gasket and 2-piece clamp to seal the reactor. A glass thermometer is inserted into one of the necks and adjusted to provide indication of the fluid temperature. A glass condenser is installed in the central port to reflux vapors from the flask. The condenser is cooled with a laboratory water chiller. The third port is sealed with a glass plug.

The fluid temperature is maintained at near the boiling point of the fluid, typically 85 to 105° C. The oil bath is typically maintained at about 20 to 40° C. above the desired reactor fluid temperature to ensure vigorous boiling of the reactor fluid. The time at which active boiling is first noted is recorded and establishes the zero time for a given test. The test is then continued for a pre-selected length of time and reactor fluid temperatures are recorded periodically. The treated material is retrieved from the fluid and washed immediately with de-ionized water. The material is then allowed to soak in de-ionized water for a period of time, typically overnight, before additional tests are conducted with it.

Figure 5:
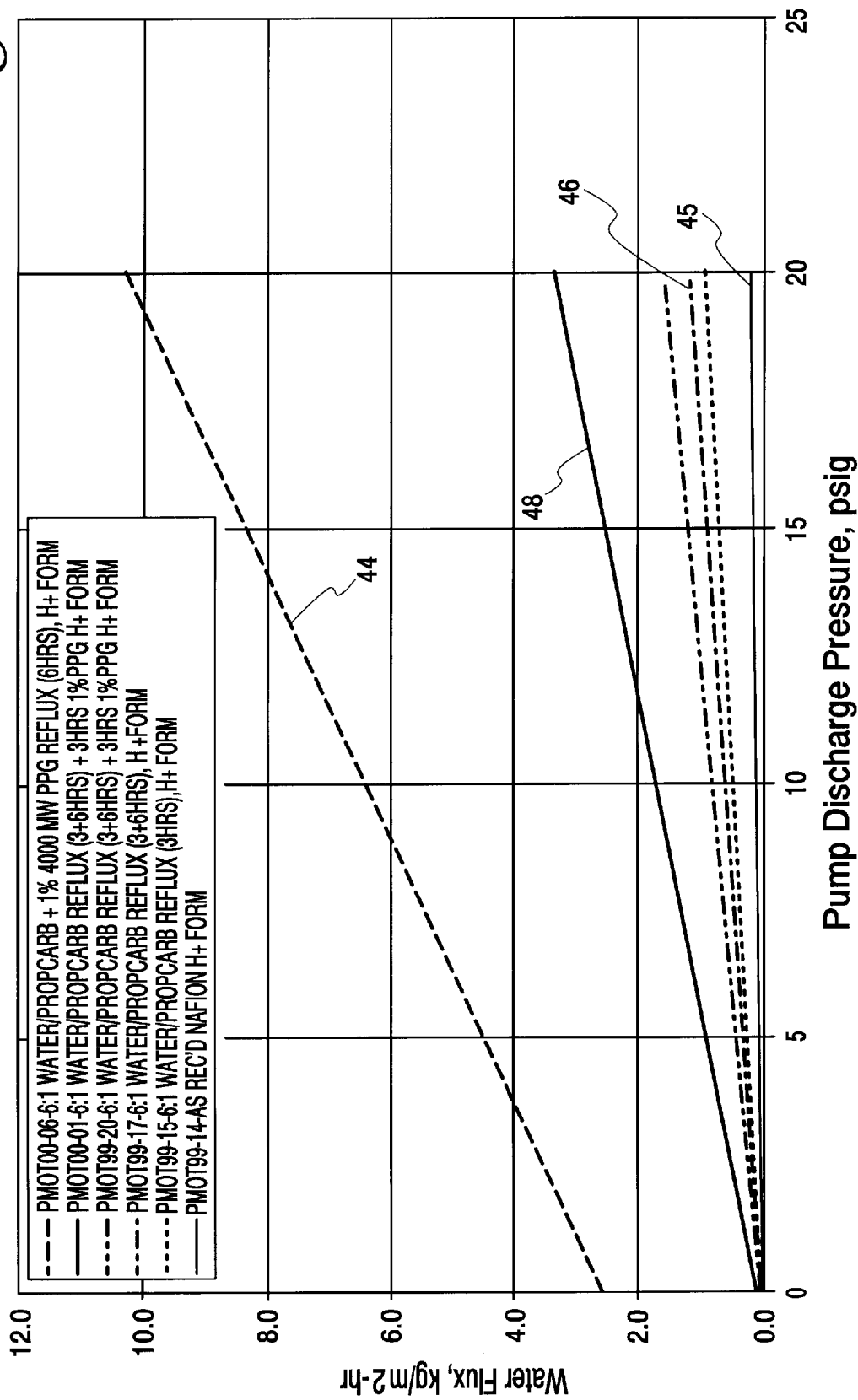
FIG. 5 is a graph comparing flux in materials subjected to various reaction conditions, versus untreated materials, in accordance with features of the present invention.

FIG. 5 illustrates the flux of a material when a porosigen is introduced simultaneously during ester hydrolysis 44, versus when no porosigen is introduced 46. Porosigens having an average molecular weight of 4000 provide suitable results.

Porosity also is obtained (48) by using the porosigen subsequent to ester hydrolysis, as evidenced by the nearly 5-fold higher flux rates compared to the flux rates of perforated membranes developed with non-porosigen protocols, 46. Additionally, the inventors have found that the sooner the porosigen is introduced during ester hydrolysis, the greater the degree of porosity conferred. See for example simultaneous presence of perosigen 44 at ester hydrolysis versus perosigen introduction after the initial ester hydrolysis.

Without ester hydrolysis, the original membrane has negligible flux, as seen in curve 45 of FIG. 5.

EXAMPLE 2

The Intense Pulsed Neutron Source (IPNS) at Argonne National Laboratory provided the inventors with the ability to conduct neutron scattering spectroscopy on a variety of materials. For the measurement of structures of polymers and polymer blends, the Small Angle Neutron Scattering (SANS) spectroscopy is very useful. This technique can probe structures ranging from 10 to 1000 angstroms in size. Neutrons of various wavelengths strike a sample and portions of the neutrons scatter and are collected by special detectors. The intensities of scattered neutrons are plotted as a function of the distance between regions.

The basic equation correlating distance and scattering angle is $$Q = (4\Pi/\lambda) \sin \theta \quad \text{Eq. 4}$$

where Q is a function of the reciprocal of the distance or size average in Angstroms, $\lambda$ is the wavelength of the neutron and $\theta$ is the half scattering angle.

FIG. 3 is a plot of the neutron intensity I as a function of Q. The plot shows changes in regions of the polymer structure. The upper spectra, 40, depicts a treated material (PMOT00-06C of Table 1). This treated material had higher water flux, as depicted in FIG. 5, 44. The upper spectra 40 shows higher intensities caused by ordered structures in the 60 to 100 Å range.

The lower spectra, 42, represents untreated material (PMOT99-14 of Table 1) which had low water flux, as depicted in FIG. 5, 45. This lower spectra, 42 shows no increases in intensity of ordered structures. Rather just a broad smear of unordered polymer structure can be noted.

In summary, the spectra depicted in FIG. 3 shows that a new microporous structure has been developed having superior water flux.

EXAMPLE 3

This example is provided to show that simple devolatilization of a gas from a membrane does not induce suitable porosity for filtration processes. A NAFION® 112 membrane sheet in $H^+$ form similar to that in Example 1 was rolled into a stainless steel tube. The tube was fitted with valves and tubing to pressurize and depressurize the tube.

Supercritical $CO_2$ gas was introduced into the tube containing the membrane to a pressure of approximately 4,500 psig, and at a temperature of approximately 39 C. The system was left in this condition for approximately 16 hours, and then quickly depressurized. The membrane sheet was then removed from the tubular pressurization chamber and subjected to the same filtration test apparatus as the other membranes.

Water flux of the pressurized membrane was very low and did not differ from that of the untreated Nafion 112 $H^+$ membrane 45, in FIG. 5.

Aqueous Phase Flux
Measurement Detail

Figure 6:
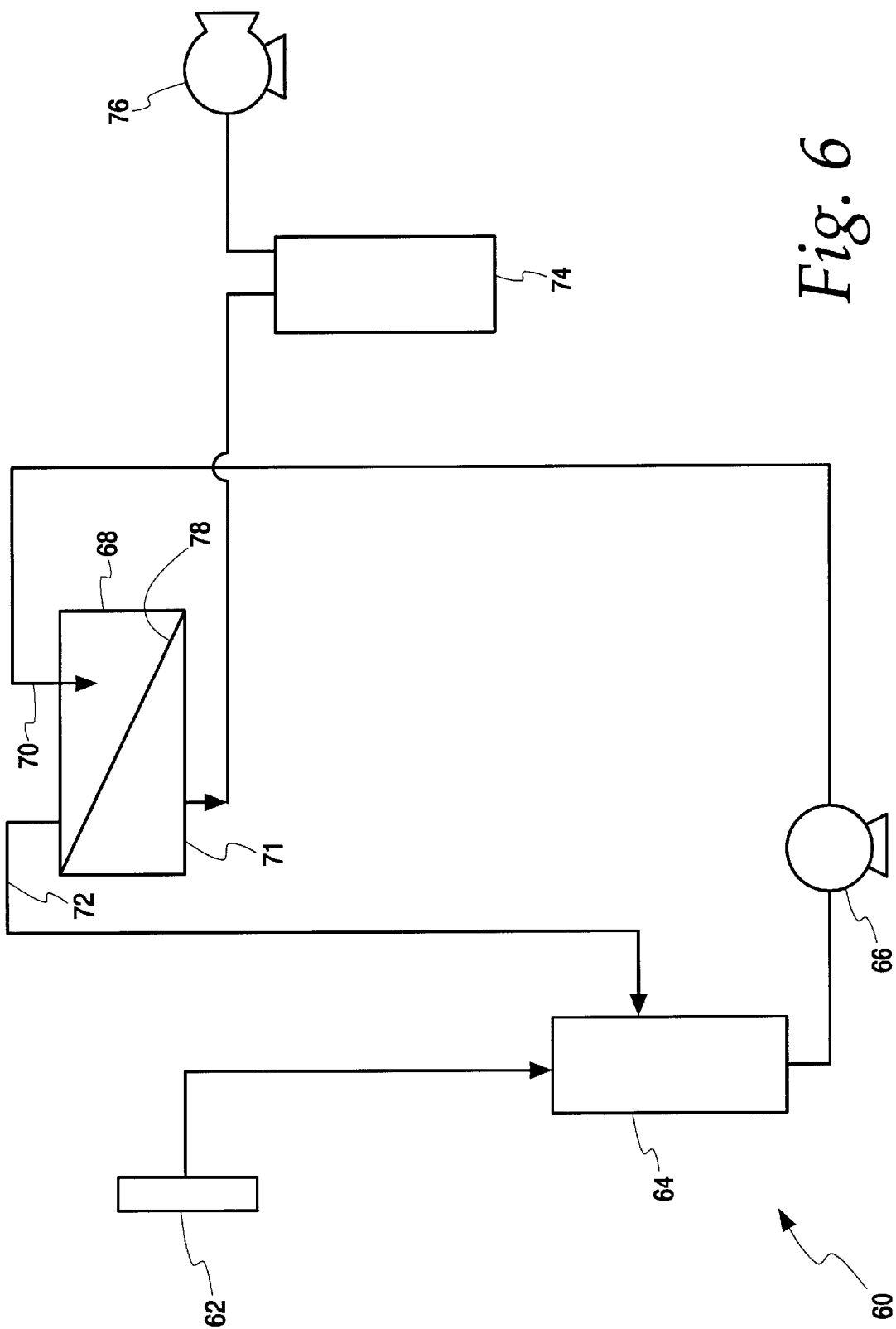
FIG. 6 is a schematic diagram of the water flux material test system.

This test procedure was conducted to evaluate the separation performance of treated materials by measuring liquid filtration rates through them. Various fluids may be used, but the tests are typically conducted with water or a mixture of about 20 wt % water and 80 wt % xylene. A flat sheet material test system is used to conduct the procedure. FIG. 6 is a schematic diagram for this water flux material test system.

A circular sample of the candidate material 78, measuring approximately 6-¼-in diameter, is placed onto a fritted disk in the filter housing 68 and the housing is sealed. The test solution is pumped from a sealed feed tank 64 into the housing, distributed over the top surface of the material, and then recirculated back to the feed tank. Consequently, this test is conducted in a pump around loop, rather than in a single-pass mode. Any fluid which filters through the material 78 passes through the fritted disk, drained through a port in the bottom of the housing, and collected in a graduated glass buret 74. Valves in the liquid recirculation loop and at the bottom of the buret are used to collect samples of the feed and filtrate, respectively. The fluid entering the housing is referred to as the feed 70, that leaving the housing and recycled back to the tank is referred to as the retentate 72, and the fluid passing through the material is referred to as the filtrate 71.

The driving force for filtration is supplied by discharge pressure from a liquid recirculation pump 66 and by directing gas from a compressed gas cylinder 62 to the head space in the liquid storage tank. The gas exerts pressure on the entire liquid recirculation loop and is usually adjusted to provide a system pressure of about 5 to 20 psig. A vacuum can be drawn on the filtrate side 71 of the housing to increase filtration driving force. One means for effecting a vacuum on the filtrate side is via connection of a vacuum pump 76 to an outlet on the filtrate collection buret 74. Fluid temperature can be adjusted with a band heater on the storage tank. However, tests are generally conducted at room temperature.

Once the material and feed solution have been loaded into the system, the recirculation pump 66 is started and adjusted to a flow rate of about 1 L/min without any gas pressure. The system is allowed to stabilize for several minutes to wet the material and to check for any leaks in the system or material. Samples and data are then collected to measure filtration rate at 0 psig pressure. The gas pressure is then sequentially increased to several pressurized test conditions, allowed to stabilize at each condition.

Additional filtration samples and data are then collected. Typically samples and data are collected at 0, 5, 10, and 20 psig test conditions. Filtration rates are calculated by noting the volume of filtrate collected over a period of time (typically 5 to 20 minutes).

Filtration rates are then mathematically converted to a flux rate, expressed as kg filtrate/$m^2$ material area-hr.

Samples collected from using a mixed water/organic feed solution, such as 20% water/80% xylene are analyzed for water content by Karl-Fischer titration and for organic content by total organic carbon analyzer. These analyses are then used to determine the depletion of water from the feed solution and the amount of organic contained in the filtrate.

As noted above, the pressure filtration separation of aqueous from organic phases is enhanced by the wicking effect cause by interaction between polar groups on the aqueous moiety and the hydrophilic surface. As depicted in FIG. 4, only water is filtered away from the 2-phase water-xylene mixture. Furthermore, the flux is constant through the porous material, even as water content in the feedstream decreases from 25 weight percent to 16 weight percent. FIG. 4 depicts a steady water flux rate of approximately 8 kg/m$^2$-hr, even from a predominantly xylene phase (approximately 80 percent xylene and 20 percent water). This flux rate is only slightly lower than when pure water phase is passed (curve 52) at 9.5 kg/m$^2$-hour. The high flux rate is due to the novel wicking effect (disclosed earlier), which is a salient feature of the invented porous hydrophilic material.

While the invention has been described with reference to details of the illustrated embodiment, these details are not intended to limit the scope of the invention as defined in the appended claims.

The embodiment of the invention in which an exclusive property or privilege is claimed is defined as follows:

1. A method for producing a porous, hydrophilic ionic material, the method comprising:
   (a) supplying a nonporous, substrate containing localized ionic hydrophilic chemical clusters; and
   (b) forming defined pore sized apertures in the clusters in situ via chemical reactions.

2. The method as recited in claim 1, wherein the apertures are from between 40 Å and 200 Å in diameter.

3. The method as recited in claim 1, wherein the substrate is oxidatively stable.

4. The method as recited in claim 1, wherein the substrate is an ionomer membrane.

5. The method as recited in claim 1, wherein the step of forming apertures comprises subjecting the clusters to expanding chemical moieties produced by chemical reactions occurring at the hydrophilic ionic clusters.

6. The method as recited in claim 5, wherein the moieties are the products of in situ ester hydrolysis.

7. The method as recited in claim 6, wherein macromolecules are embedded into the apertures when the apertures are formed.

8. The method as recited in claim 7, wherein the macromolecules are removed from the apertures.

9. The method as recited in claim 8, wherein the macromolecule has a size of between 200 MW and 20,000 MW.

10. The method as recited in claim 7, wherein the macromolecule is a polyhydric alcohol selected from the group consisting of polypropylene glycol, polyethylene glycol, polylactic acid, and combinations thereof.

11. The method as recited in claim 5, wherein the moieties are gaseous.

12. A method for separating aqueous phases from mixtures of organic and aqueous phases, the method comprising:
    a) supplying an ionomeric membrane having hydrophillic regions defining pores, wherein the membrane has a first surface and a second surface;
    b) contacting the mixture to the first surface for a time and at a pressure sufficient to facilitate transfer of the aqueous phase through the pores; and
    c) collecting the aqueous phase from the second surface.

13. The method as recited in claim 12, wherein the aqueous phases are ionically attracted to the pores.

14. The method as recited in claim 12, wherein the pores have diameters ranging from between 40 Å and 200 Å.

15. The method as recited in claim 12 wherein the aqueous phase flows through the pores at a rate of at least approximately 5 kg/(m$^2$·hour).

* * * * *

UNITED STATES PATENT AND TRADEMARK OFFICE
CERTIFICATE OF CORRECTION

PATENT NO.      : 6,464,880 B1
DATED           : October 15, 2002
INVENTOR(S)     : Datta et al.

It is certified that error appears in the above-identified patent and that said Letters Patent is hereby corrected as shown below:

Column 10,
Line 37, insert:
16. A material produced by the method recited in claim 1.

Signed and Sealed this

Twenty-eighth Day of October, 2003

JAMES E. ROGAN
*Director of the United States Patent and Trademark Office*